United States Patent
Xu et al.

(10) Patent No.: US 11,796,846 B2
(45) Date of Patent: Oct. 24, 2023

(54) LASER PULSE SHAPING DEVICE AND METHOD, PULSE SHAPER, AND OPTICAL SYSTEM

(71) Applicant: FEMTOSECOND RESEARCH CENTER CO., LTD., Guangzhou (CN)

(72) Inventors: Bingwei Xu, Guangzhou (CN); Xin Zhu, Guangzhou (CN)

(73) Assignee: FEMTOSECOND RESEARCH CENTER CO., LTD., Guangzhou (CN)

( * ) Notice: Subject to any disclaimer, the term of this patent is extended or adjusted under 35 U.S.C. 154(b) by 0 days.

(21) Appl. No.: 18/026,131

(22) PCT Filed: Sep. 8, 2021

(86) PCT No.: PCT/CN2021/117245
§ 371 (c)(1),
(2) Date: Mar. 14, 2023

(87) PCT Pub. No.: WO2022/057710
PCT Pub. Date: Mar. 24, 2022

(65) Prior Publication Data
US 2023/0288740 A1    Sep. 14, 2023

(30) Foreign Application Priority Data

Sep. 16, 2020  (CN) .......................... 202010977383.3

(51) Int. Cl.
*G02F 1/137* (2006.01)
*G02F 1/133* (2006.01)
(Continued)

(52) U.S. Cl.
CPC ..... *G02F 1/13318* (2013.01); *G02B 27/1006* (2013.01); *G02F 1/137* (2013.01);
(Continued)

(58) Field of Classification Search
CPC ............ G02B 27/1006; G02F 2203/26; G02F 1/13318; G02F 1/133504; G02F 1/133526; G02F 1/137
(Continued)

(56) References Cited

U.S. PATENT DOCUMENTS

| 5,862,287 A | 1/1999 | Stock et al. |
| 7,576,907 B1 | 8/2009 | Bartels et al. |

(Continued)

FOREIGN PATENT DOCUMENTS

| CN | 1943083 A | 4/2007 |
| CN | 206685694 U | 11/2017 |

(Continued)

*Primary Examiner* — William R Alexander
(74) *Attorney, Agent, or Firm* — Bayramoglu Law Offices LLC (57) ABSTRACT

A laser pulse shaping device and method, a pulse shaper, and an optical system are provided. The laser pulse shaping device includes a pulse shaper provided in an optical path connected to a laser source, a laser detection device provided at an actual position of a target of a laser pulse, and the laser source configured to generate the laser pulse, which is transmitted to the target through the optical path. The laser detection device is configured to measure and send an optical parameter of the laser pulse transmitted to the target to the control device. The control device is configured to calculate a phase compensation parameter according to the optical parameter and control the pulse shaper to compensate a phase of the laser pulse transmitted through the optical path according to the phase compensation parameter, such that the optical parameter of the laser pulse reaches a target value.

14 Claims, 6 Drawing Sheets

(51) Int. Cl.
*G02B 27/10* (2006.01)
*G02F 1/1335* (2006.01)

(52) U.S. Cl.
CPC .. *G02F 1/133504* (2013.01); *G02F 1/133526* (2013.01); *G02F 2203/26* (2013.01)

(58) Field of Classification Search
USPC .......................................................... 359/264
See application file for complete search history.

(56) References Cited

U.S. PATENT DOCUMENTS

| | | | |
|---|---|---|---|
| 2005/0168735 A1* | 8/2005 | Boppart | G01N 21/65 356/301 |
| 2006/0056468 A1 | 3/2006 | Dantus et al. | |
| 2006/0192969 A1* | 8/2006 | Marks | G01N 21/65 356/451 |
| 2012/0327963 A1 | 12/2012 | Hubbard et al. | |
| 2014/0218726 A1 | 8/2014 | Cheng et al. | |
| 2016/0199935 A1 | 7/2016 | Chen et al. | |
| 2020/0173860 A1 | 6/2020 | Alonso Fernandez et al. | |
| 2020/0295519 A1* | 9/2020 | Xu | G01J 11/00 |
| 2020/0301174 A1* | 9/2020 | Watanabe | G03B 15/00 |

FOREIGN PATENT DOCUMENTS

| | | | |
|---|---|---|---|
| CN | 107462336 A | 12/2017 | |
| CN | 107632402 A | 1/2018 | |
| CN | 108539573 A | 9/2018 | |
| CN | 108885360 A | 11/2018 | |
| CN | 108886567 A | 11/2018 | |
| CN | 110048293 A | 7/2019 | |
| CN | 112186475 A | 1/2021 | |
| JP | 2005069832 A | 3/2005 | |

\* cited by examiner

LASER PULSE SHAPING DEVICE AND METHOD, PULSE SHAPER, AND OPTICAL SYSTEM

CROSS REFERENCE TO THE RELATED APPLICATIONS

This application is the national phase entry of International Application No. PCT/CN2021/117245, filed on Sep. 8, 2021, which is based upon and claims priority to Chinese Patent Application No. 202010977383.3, filed on Sep. 16, 2020, the entire contents of which are incorporated herein by reference.

TECHNICAL FIELD

The present application relates to the technical field of laser and in particular to a laser pulse shaping device and method, a pulse shaper, and an optical system.

BACKGROUND

In the process of laser pulse transmission in the optical system, due to the dispersion in the optical path, in particular, the dispersion of the second order or above, the laser pulse will have a "time-domain stretching" effect when passing through the optical path. That is, the width of the laser pulse along the time-axis will increase with the propagation of the laser pulse in the optical path. In particular, when the femtosecond laser pulse passes through the optical path, its width along the time-axis will change from femtosecond to picosecond, resulting in a significant reduction in the peak power of the femtosecond laser pulse and loss of the characteristics of the femtosecond laser pulse.

Figure 1:
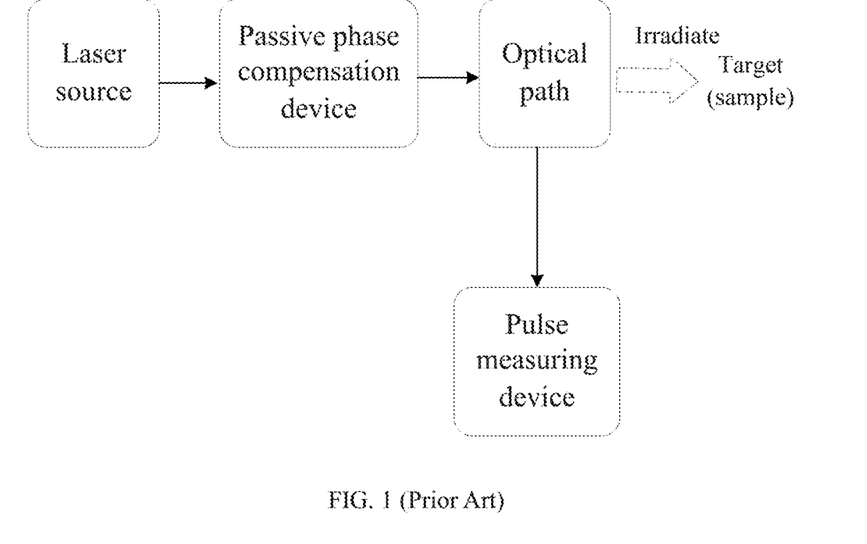
FIG. 1 is a structure diagram of a traditional laser phase compensation device.

At present, an optical system that uses femtosecond laser pulses (in particular those less than 100 femtoseconds) usually compensates the phase of the laser pulse in the optical path to optimize the state of the laser pulse. FIG. 1 is a structure diagram of a traditional laser phase compensation device. As shown in FIG. 1, a laser source generates a laser pulse, which is transmitted to a target through an optical path. A passive phase compensation device is provided in the optical path right after the laser source. The laser pulse is led out through a branched optical path from the main optical path to enter an external pulse measuring device. The pulse measuring device checks the shape or phase of the laser pulse. According to the measurement result of the pulse measuring device, the passive phase compensation device is adjusted to optimize the laser pulse. Such measurement and adjustment are repeated until the laser pulse measured by the pulse measuring device is the shortest. Then, the pulse measuring device is removed, and the state of the passive phase compensation device is maintained/saved, such that the laser pulse of the optical system reaches a relatively optimized state.

In the above technical solution, after the laser pulse is measured, the passive phase compensation device is fixed in a certain state. If the optical path or the laser source changes, the laser pulse will change, resulting in the original passive compensation settings incapable of fully compensating for the time-domain stretching of the laser pulse. In this case, the measurement and adjustment process can only be carried out again, resulting in a complex operation and poor accuracy. In addition, the laser pulse measured by the pulse measuring device is usually not one at the actual position of the target of the laser pulse, but the pulse state of the measuring point. Therefore, even if the measurement and adjustment processes are carried out, the optimized state at the actual position of the target of the laser pulse cannot be achieved, thereby affecting the performance of the laser pulse.

SUMMARY

To solve most, if not all, of the above technical defects, particularly the complicated operation and poor accuracy induced by measurement and adjustment repetition when the optical path changes, an objective of the present application is to provide a laser pulse shaping device and method, a pulse shaper, and an optical system.

The laser pulse shaping device includes a pulse shaper, a control device, and a laser detection device that are connected in sequence.

The pulse shaper is provided in an optical path connected to a laser source, and the laser detection device is provided at an actual position of a target of a laser pulse.

The laser source is configured to generate the laser pulse, which is transmitted to the target through the optical path.

The laser detection device is configured to measure and send an optical parameter of the laser pulse transmitted to the target to the control device.

The control device is configured to calculate a phase compensation parameter according to the optical parameter and control the pulse shaper to compensate a phase of the laser pulse transmitted through the optical path according to the phase compensation parameter, such that the optical parameter of the laser pulse transmitted to the target reaches a target value.

The pulse shaper includes a grating, a cylindrical lens, and a two-dimensional spatial light modulator (2D-SLM).

The grating scatters an incident laser pulse into a space, and the scattered laser pulse passes through the cylindrical lens to form multiple linear light beams that are uniformly distributed and have different wavelengths.

The linear light beams pass through the 2D-SLM for phase modulation and spectral intensity control.

After the phase modulation and spectral intensity control, the linear light beams are reversed to the laser pulse by the cylindrical lens and the grating to be output.

The laser pulse shaping method includes the following steps:
  receiving a laser pulse generated by a laser source, transmitting the laser pulse to a target of the laser pulse through an optical path connected to the laser source;
  measuring an optical parameter of the laser pulse transmitted to the target of the laser pulse at an actual position of the target of the laser pulse; and
  calculating a phase compensation parameter according to the optical parameter, and compensating a phase of the laser pulse transmitted through the optical path according to the phase compensation parameter, such that the optical parameter of the laser pulse transmitted to the target reaches a target value.

The optical system includes a laser source, an optical path, and a laser pulse shaping device.

The laser pulse shaping device includes a pulse shaper, a control device, and a laser detection device that are connected in sequence.

The pulse shaper is provided in the optical path connected to the laser source, and the laser detection device is provided at an actual position of a target of a laser pulse.

The laser source is configured to generate the laser pulse, which is transmitted to the target through the optical path.

The laser detection device is configured to measure and send an optical parameter of the laser pulse transmitted to the target to the control device.

The control device is configured to calculate a phase compensation parameter according to the optical parameter and control the pulse shaper to compensate a phase of the laser pulse transmitted through the optical path according to the phase compensation parameter, such that the optical parameter of the laser pulse transmitted to the target reaches a target value.

In the said laser pulse shaping device, method, and optical system, the intensity or spectral change of a nonlinear optical phenomenon caused by the laser pulse is measured at the actual position of the interaction between the laser pulse after its passing the transmission port and the target; the spectral phase dispersion accumulated by the laser pulse in the whole optical path before the laser pulse reaches the target is acquired, and the phase compensation parameter is calculated before the control device controls the pulse shaper to compensate the phase of the laser pulse in the optical path according to the phase compensation parameter, such that the spectral phase of the laser pulse transmitted to the target reaches the target value. This solution reduces the measurement complexity, fulfills the goal of a closed-loop test, improves the accuracy of pulse compression compensation through the pulse shaper, and enhances the performance of the laser pulse.

In addition, through the calculation of the phase function of the spectral phase dispersion accumulated by the laser pulse in the whole optical path, the negative function of the phase function is acquired and introduced into the optical path to act upon the laser pulse to offset the spectral phase dispersion of the laser pulse. In this way, the laser pulse reaches the pulse width of the Fourier transform limit, that is, the shortest pulse width, which effectively guarantees the peak power of the laser pulse, thereby maintaining the femtosecond characteristics of the laser pulse.

The pulse shaper includes a grating, a cylindrical lens, and a two-dimensional spatial light modulator (2D-SLM).

The grating scatters an incident laser pulse into a space, and the scattered laser pulse passes through the cylindrical lens to form multiple linear light beams that are uniformly distributed and have different wavelengths.

The linear light beams pass through the 2D-SLM for phase modulation and spectral intensity control.

After the phase modulation and spectral intensity control, the linear light beams are reversed to the laser pulse by the cylindrical lens and the grating to be output.

In an embodiment, the 2D-SLM includes a pixel array composed of multiple liquid crystals.

The linear light beams converge along an X-axis and remain unchanged along a Y-axis. All the linear light beams of different wavelengths are uniformly distributed along the X-axis.

Along the Y-axis, each column of pixels in the pixel array corresponds to the linear light beam of the same wavelength. Along the X-axis, different columns of pixels in the pixel array respectively correspond to the linear light beams of different wavelengths.

In an embodiment, each column of pixels in the pixel array along the Y-axis forms an individual grating-like serrated surface with an angle, intensity, and frequency changing with the wavelength.

The frequency and intensity of the serrated surface of a particular column of pixels are controlled to refract a certain proportion of the linear light beam to an effective transmission direction to control the spectral intensity of the linear light beam. A refractive index of the very column of pixels is controlled to achieve a spectral phase of the linear light beam.

In the pulse shaper, the cylindrical lens converges the light scattered by the grating into continuous linear light beams of different wavelengths. The 2D-SLM performs power control and phase adjustment on the linear light beams of different wavelengths. Therefore, through the use of one phase adjustment SLM on the Fourier plane, the spectral intensity control and phase adjustment of the laser pulse are achieved, thereby reducing the equipment cost and improving control accuracy on the spectral intensity.

In addition, on the 2D-SLM, the same column of liquid crystal pixels controls the linear light beam of the same wavelength. The control parameter of the pixel unit in the column of pixels is adjusted to refract the light beam to the effective first-order direction or the zero-order direction (original direction) to achieve the spectral intensity control of the light beam. The same refractive index parameter is introduced into the same column of pixels to realize the phase adjustment of the light beam. The pulse shaper can shape any laser pulse transmitted through the optical path and compensate for any dispersion caused by the optical path through the active pulse shaping. In addition, the liquid crystal pixels form the grating-like structure to control the power intensity of the light beams, which greatly improves the control accuracy of the power intensity of the light beams.

Furthermore, the spectral phase dispersion accumulated by the laser pulse in the optical path is calculated, and the control device controls the pulse shaper to introduce the negative function of the calculated phase function into the optical path to offset the dispersion. In theory, this can generate the shortest pulse width of the laser pulse at the position of the sample/laser target.

Additional aspects and advantages of the present application will be provided in the following description and well illustrated in the following description or understood through the practice of the present application.

BRIEF DESCRIPTION OF THE DRAWINGS

The foregoing and/or additional aspects and advantages of the present application will become apparent and readily understandable from the following descriptions of the embodiments with reference to the drawings.

DETAILED DESCRIPTION OF THE EMBODIMENTS

The embodiments of the present application are described below in detail. The embodiments are shown in the drawings. The same or similar numerals represent the same or similar elements or elements having the same or similar functions throughout the specification. The embodiments described below with reference to the drawings are exemplary and are merely intended to explain the present application rather than to limit the present application.

Those skilled in the art can understand that, unless otherwise stated, the singular forms "a", "an", "said" and "the" used herein may also include plural forms. It should be further understood that the term "comprising" used in the specification of the present application refers to the presence of the described features, integers, steps, operations, elements, and/or components but does not exclude the presence or addition of one or more other features, integers, steps, operations, elements, components, and/or a combination thereof.

Figure 2:
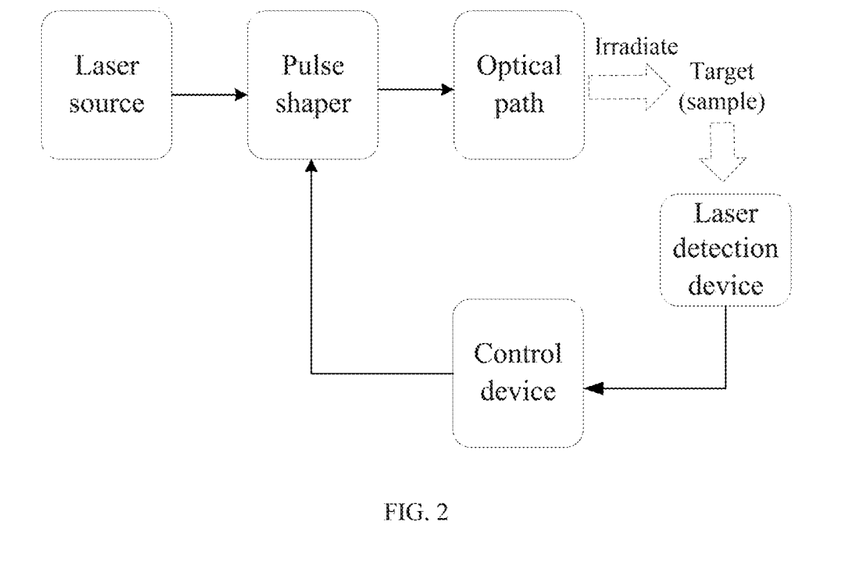
FIG. 2 is a structure diagram of a laser pulse shaping device according to an embodiment of the present application.

FIG. 2 is a structure diagram of a laser pulse shaping device according to the present application. Referring to FIG. 2, the laser pulse shaping device is configured to shape laser pulses in various optical systems using laser pulses. The laser pulse shaping device includes a pulse shaper, a control device, and a laser detection device that are connected in sequence. The pulse shaper is provided in an optical path connected to a laser source. In practical application, the position of the pulse shaper can be set as required. The pulse shaper and the optical path do not necessarily have relative positions, and FIG. 2 is only an example. The laser detection device is provided at the actual position of a target of the laser pulse.

As shown in FIG. 2, after the laser pulse is transmitted from the laser source, it is transmitted to the target (such as a sample to be tested) through the optical path. To acquire a spectral phase dispersion accumulated by the laser pulse in the whole optical path before the laser pulse reaches the target, the laser detection device is provided at the actual position of the interaction between the laser pulse and the target to measure an intensity or spectral change of a nonlinear optical phenomenon caused by the laser pulse. The laser detection device may use a spectrometer or other photoelectric conversion device to convert an optical signal into an electrical signal to be sent to the control device. The laser detection device sends the measurement signal to the control device. In practical application, the function of the control device can be realized through a personal computer (PC). The control device calculates a phase compensation parameter according to an optical parameter and controls the pulse shaper to compensate a phase of the laser pulse passing through the optical path according to the phase compensation parameter, such that the optical parameter of the laser pulse transmitted to the target reaches a target value.

In the laser pulse shaping device of the above embodiment, the intensity or spectral change of a nonlinear optical phenomenon caused by the laser pulse is measured at the actual position of the interaction between the laser pulse and the target laser pulse passes the transmission port. The spectral phase dispersion accumulated by the laser pulse in the whole optical path is acquired, and the phase compensation parameter is calculated. The control device controls the pulse shaper to compensate the phase of the laser pulse in the optical path according to the phase compensation parameter, such that the spectral phase of the laser pulse transmitted to the target reaches the target value. This solution reduces the measurement complexity, realizes a closed-loop test, improves the shaping accuracy through the pulse shaper, and enhances the performance of the laser pulse.

In an embodiment, the control device is further configured to calculate a phase function and the corresponding negative function of the spectral phase dispersion accumulated by the laser pulse in the whole optical path before reaching the target according to the optical parameter. The pulse shaper introduces the negative function to the optical path to act on the laser pulse to offset the spectral phase dispersion of the laser pulse.

In the solution of the above embodiment, the phase function of the spectral phase dispersion accumulated by the laser pulse in the whole optical path is calculated. The negative function of the phase function is acquired and introduced into the optical path to act on the laser pulse to offset the spectral phase dispersion of the laser pulse. In this way, the laser pulse width is the shortest at the target, which effectively guarantees the peak power of the laser pulse, thereby maintaining the femtosecond characteristics of the laser pulse.

An embodiment of a laser pulse shaping method is described below.

Figure 3:
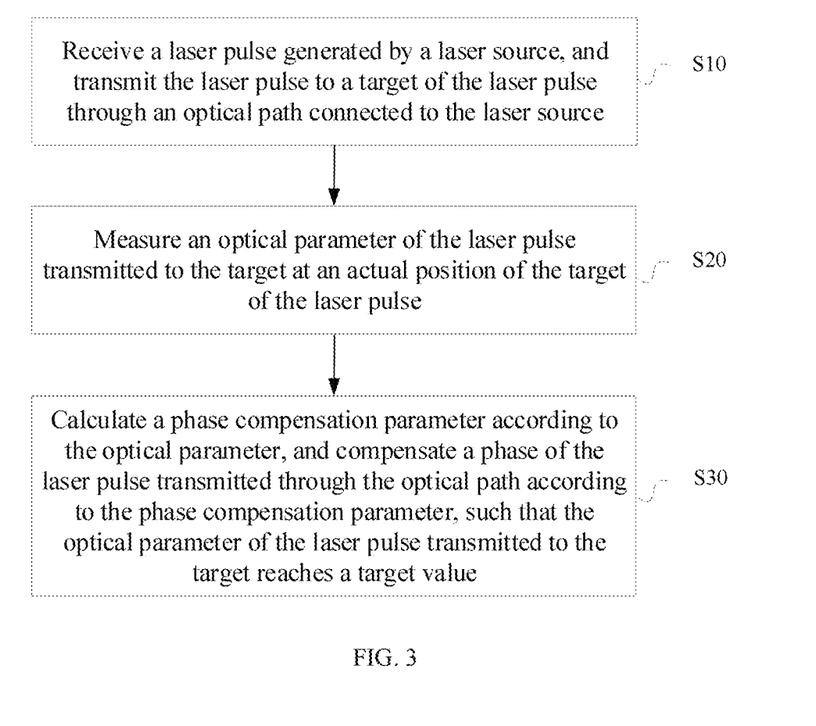
FIG. 3 is a flowchart of a laser pulse shaping method according to an embodiment of the present application.

FIG. 3 is a flowchart of the laser pulse shaping method. Referring to FIG. 3, the laser pulse shaping method includes the following steps:

S10. A laser pulse generated by a laser source is received and transmitted to a target of the laser pulse through an optical path connected to the laser source. The target may be a sample to be tested, such as biological tissue.

S20. An optical parameter of the laser pulse transmitted to the target of the laser pulse is measured at the actual position of the target of the laser pulse. Specifically, the optical parameter may be a signal intensity, spectrum or spectral phase of the pulse, laser pulse strength, and other information generated by a nonlinear action of the pulse.

In an embodiment, the intensity of the nonlinear phenomenon, such as second harmonic, third harmonic, and multi-photon fluorescence intensity, can be measured. The measured second harmonic, third harmonic, or multi-photon fluorescence are each converted into electrical signals to acquire the intensity of the nonlinear signal action.

S30. A phase compensation parameter is calculated according to the optical parameter, and a phase of the laser pulse transmitted through the optical path is compensated according to the phase compensation parameter, such that the optical parameter of the laser pulse transmitted to the target reaches a target value. For example, the pulse width of the laser pulse reaches a Fourier transform limit.

In an embodiment, in step S30, the phase compensation parameter may be calculated as follows:

A phase function of the spectral phase dispersion accumulated by the laser pulse in the whole optical path is calculated according to the optical parameter, and a negative function of the phase function is acquired.

Further, in step S30, the compensating of the phase of the laser pulse transmitted through the optical path according to the phase compensation parameter may include the negative function being introduced to the optical path to act on the laser pulse to offset the spectral phase dispersion of the laser pulse.

Preferably, as a supplement to step S30, the target value may be the pulse width of the laser pulse on the target that reaches the Fourier transform limit, that is, the minimum pulse width.

In the technical solution of each embodiment above, the phase function of the spectral phase dispersion accumulated by the laser pulse in the whole optical path is calculated. The negative function of the phase function is acquired and introduced into the optical path to act on the laser pulse to offset the spectral phase dispersion of the laser pulse. In this way, the laser pulse width is the shortest at the target, which effectively guarantees the peak power of the laser pulse, thereby maintaining the femtosecond characteristics of the laser pulse.

An embodiment of a pulse shaper is described below.

The pulse shaper provided by the present application is improved based on the structure of a traditional pulse shaper to reduce the equipment cost and complexity while simultaneously improve the spectral intensity control accuracy. The pulse shaper of the present application can be used in the new (in comparison to prior art) solution design of the laser pulse shaping device provided by the present application and can also be used in the optical path of any other optical system to shape the laser pulse passing through the optical path.

Figure 4:
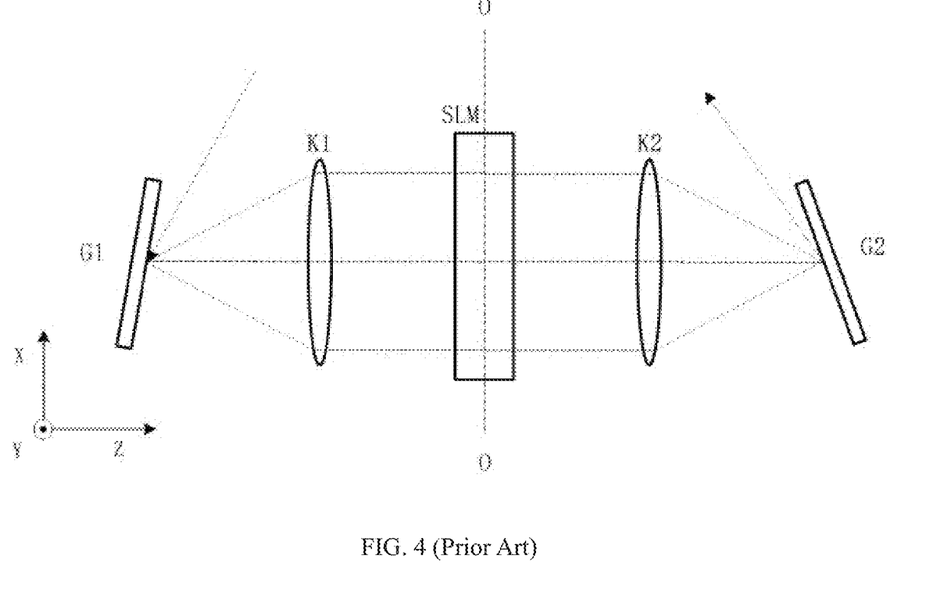
FIG. 4 is a structure diagram of a traditional pulse shaper.

FIG. 4 is a structure diagram of a traditional pulse shaper. Referring to FIG. 4, the traditional pulse shaper scatters a light beam through a first grating G1 and focuses the light beam on a one-dimensional spatial light modulator (1D-SLM) through a convex lens K1 to form spot light beams of different wavelengths. The liquid crystal pixels of the 1D-SLM modulate the spot light beams of different wavelengths. A second grating G2 reduces the spot light beams and outputs a modulated laser pulse. For the transmissive liquid crystal SLM shown in FIG. 4, the two sides of the "O-O" dotted line define a mirror-image relation.

Figure 5:
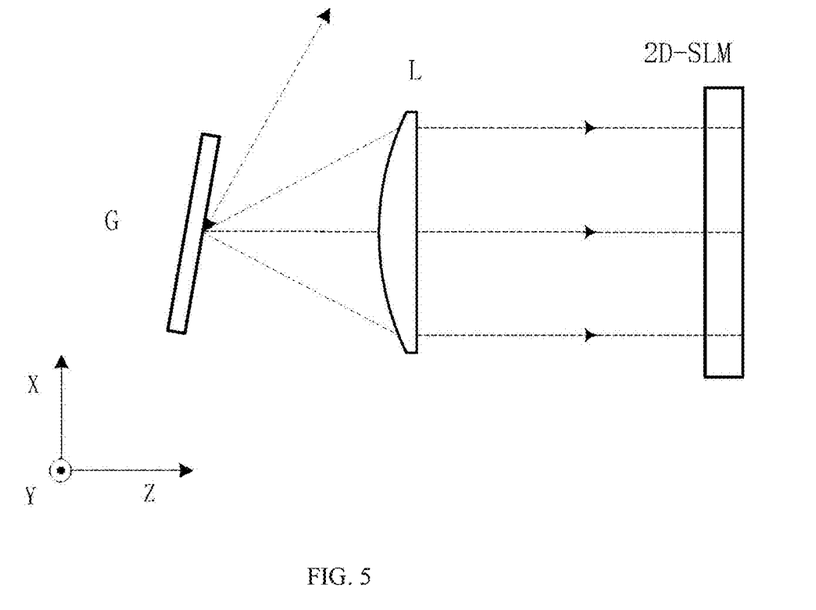
FIG. 5 is a structure diagram of a pulse shaper according to an embodiment of the present application.

FIG. 5 is a structure diagram of the pulse shaper according to the present application. Referring to FIG. 5, the pulse shaper includes grating G, first cylindrical lens L, and a two-dimensional spatial light modulator (2D-SLM). Specifically, in the present application, the cylindrical lens L focuses a laser spectrum scattered by the grating G to achieve the conversion from a time domain to a frequency domain, and the 2D-SLM modulates the light accordingly.

In actual operation, as shown in FIG. 5, the grating G scatters the incident laser pulse into a space. The laser pulse passes through the cylindrical lens L to form multiple linear light beams that are uniformly distributed and have different wavelengths. The 2D-SLM performs phase modulation and spectral intensity control on the linear light beams. The linear light beams are refracted after phase modulation and spectral intensity control. The refracted light beams are reduced to the laser pulse by the cylindrical lens L and the grating G.

Figure 6A:
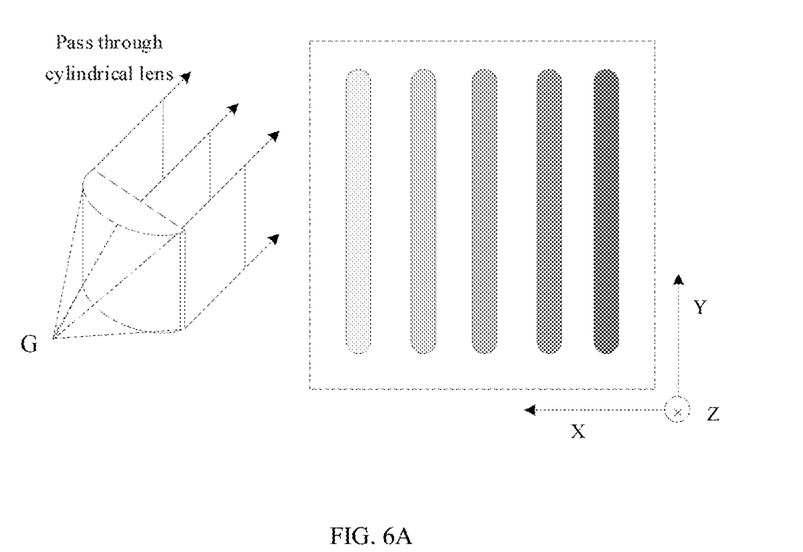
FIGS. 6A and 6B are scattering diagrams of a laser pulse according to an embodiment of the present application.
Figure 6B:
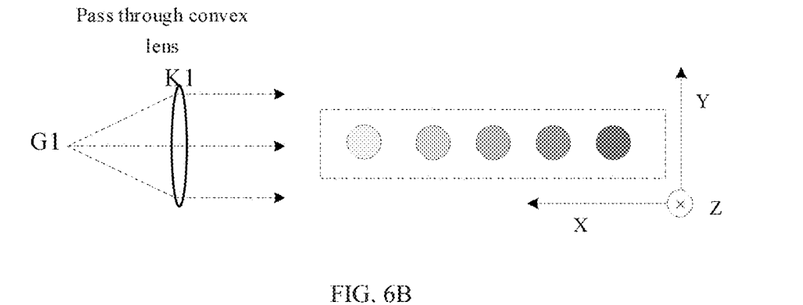

The optical path formed by the laser pulse scattered by the grating G and passing through the cylindrical lens L is shown in FIGS. 6A and 6B. FIGS. 6A and 6B show scattering diagrams of the laser pulse. FIG. 6A shows the optical path after the cylindrical lens L. Light of different wavelengths forms linear light beams. When the convex lens K1 is used, spot light beams are formed, as shown in FIG. 6B. In the present application, based on the principle that the light beams are not refracted in a cylindrical direction of the cylindrical lens L, the spot light beams are stretched to form the linear light beams to adjust the intensity of the laser pulse along the Y-axis.

Figure 7:
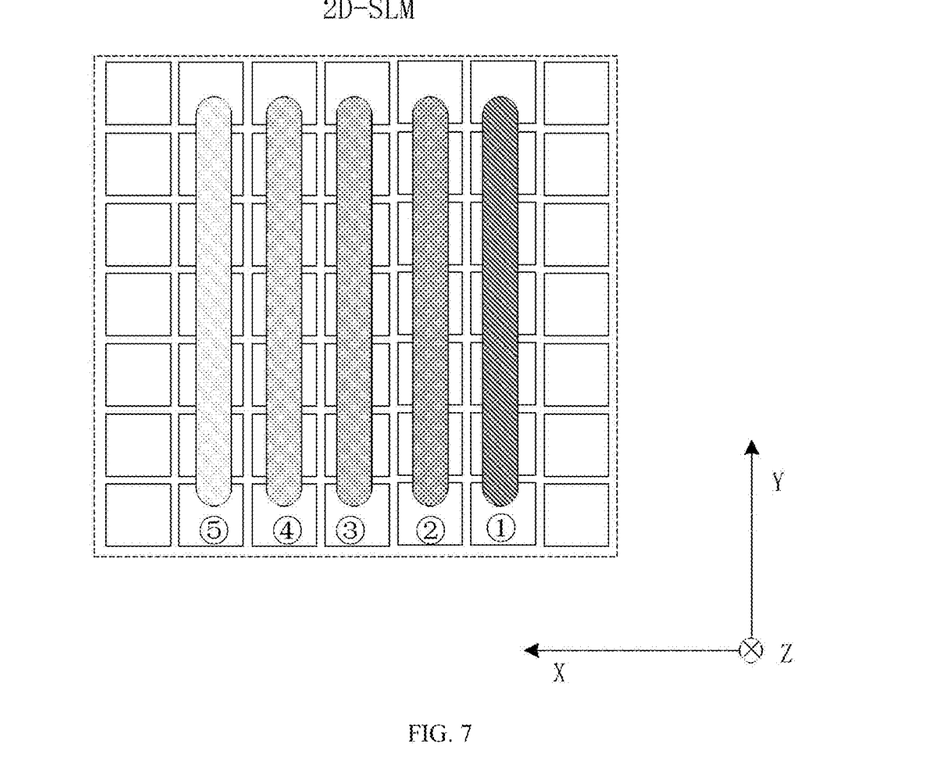
FIG. 7 shows a pixel array of a two-dimensional spatial light modulator (2D-SLM) according to an embodiment of the present application.

In this embodiment, the modulation solution of the 2D-SLM is shown in FIG. 7. FIG. 7 shows the pixel array of the 2D-SLM, in which the X-Y plane is viewed along the positive direction of the Z-axis. The 2D-SLM includes a pixel array composed of multiple liquid crystals. Each linear light beam converges along the X-axis and remains unchanged along the Y-axis. The linear light beams of different wavelengths are uniformly distributed along the X-axis. Each column of pixels in the pixel array along the Y-axis corresponds to the linear light beam of the same wavelength, and different columns of pixels in the pixel array along the X-axis respectively correspond to the linear light beams of different wavelengths.

As shown in FIG. 7, there are 5 columns of pixels along the X-axis to control 5 linear light beams (1) to (5). The refractive index of the whole column of pixels along the Y-axis is controlled to control the spectral phase of the linear light beam. In each column of pixels, different frequencies and intensities are configured to control the liquid crystal shape of the pixels of the 2D-SLM to control the direction of light refraction.

Figure 8:
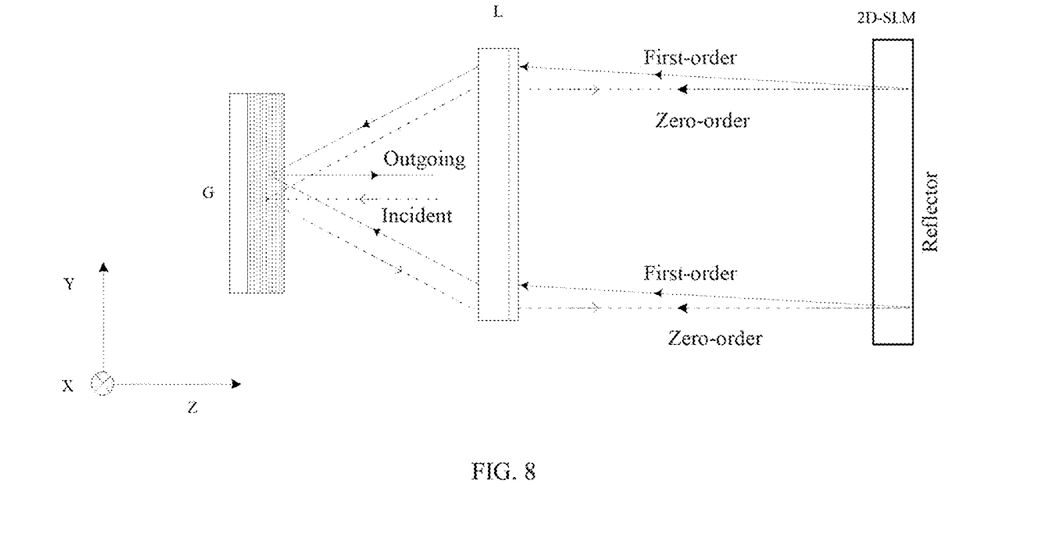
FIG. 8 shows a spectral intensity control diagram of the pulse shaper according to an embodiment of the present application.

In the pixel array of the 2D-SLM, the whole column of pixels corresponding to the linear light beam of the same wavelength along the Y-axis is shown in FIG. 8. FIG. 8 shows the spectral intensity control of the pulse shaper. In the figure, the Y-Z plane is viewed in the positive direction of the X-axis. The 2D-SLM modulates and reflects the incident light through a liquid crystal layer and a reflective surface. An effective light beam is refracted along the first-order direction. Unwanted light or unmodulated light in the pixel slit is reflected along the zero-order direction (opposite to the original direction). A certain proportion of light from any column of pixels can be controlled to be refracted along the zero-order or first-order direction through a program. For example, as shown in FIG. 7, among the 7 pixels in each column of the linear light beam (1), 3 pixels can be refracted along the zero-order direction, and 4 pixels can be refracted along the first-order direction.

In the design solution of the present application, the light is controlled in two different refraction directions, namely, the first-order and zero-order directions, which reduces the spectral intensity control error (the measured error is less than 0.1%) and greatly improves the spectral intensity control accuracy. The traditional spectral intensity control relies on a polarizer, resulting in that the spectra not accurately controlled in the pixel slit cannot be effectively separated, and the spectral intensity control error is up to 1-5%.

In addition, in the traditional control, since the unmodulated light in the pixel slit cannot be effectively separated from the modulated light, it is necessary to maximize the proportion of the pixel size to the slit. A larger proportion indicates a smaller slit, and a lower proportion of unmodulated light indicates a lower error. This puts forward higher requirements for SLM manufacturing, greatly increasing the cost and reducing the yield. In the solution design of the present application, the unmodulated light in the pixel slit is reflected along the zero-order direction and is completely separated in space from the modulated light which is along the first-order direction. Therefore, the proportion of pixel size to the slit do not affect the modulation accuracy, that is, the spectral intensity and spectral phase control accuracy. Therefore, the present application effectively reduces the requirements for SLM manufacturing, thereby reducing the cost.

Figure 9:
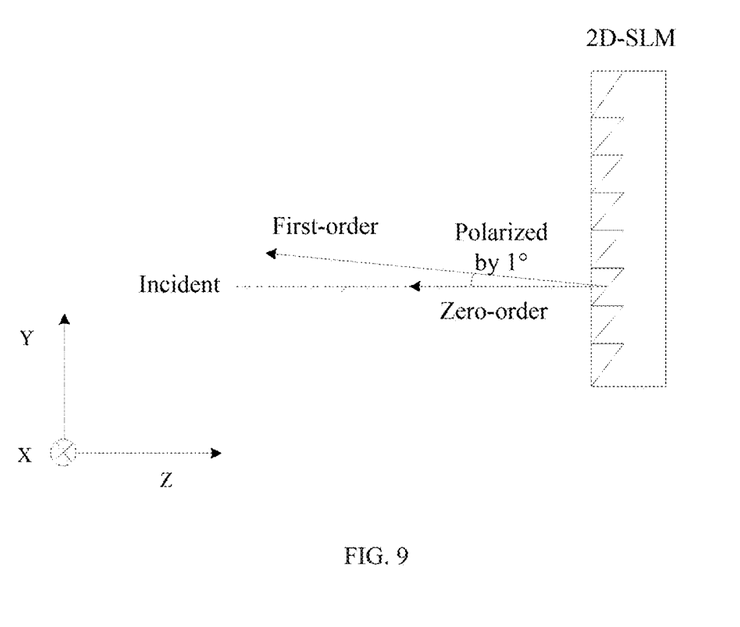
FIG. 9 shows a grating-like serrated surface formed by each column of pixels according to an embodiment of the present application.

Regarding the control principle of the 2D-SLM, a grating-like serrated surface with the angle, intensity, and frequency changing with the wavelength is formed on the 2D-SLM to achieve a virtual grating effect to refract the light. The shape of the serrated surface can be referred to in FIG. 9. FIG. 9 shows the grating-like serrated surface of each column of pixels. In the figure, the Y-Z plane is viewed in the positive direction of the X-axis. The refractive index of the grating-like structure of the 2D-SLM is changed by changing the angle, intensity, and frequency with the wavelength to refract the light along the zero-order or first-order direction.

The pulse shaper according to the above embodiment can be used to shape any laser pulse passing through the optical path and perform active phase compensation. Based on one 2D-SLM, the spectral phase and intensity of the laser pulse are controlled, thereby reducing the equipment cost, significantly improving the spectral intensity control accuracy, and reducing the error.

An embodiment of an optical system is described below.

The present application provides an optical system. As shown in FIG. 2, the optical system includes a laser source, an optical path, and a laser pulse shaping device.

Those skilled in the art should understand that, unless otherwise defined, all terms (including technical terms and scientific terms) used herein have the same meaning as those commonly understood by those of ordinary skill in the art to which the present application belongs. It should also be understood that terms such as those defined in general dictionaries should be understood as having meanings consistent with the meanings in the context of the prior art, and unless otherwise defined herein, these terms will not be explained in ideal or overly-formal meanings.

The foregoing are merely descriptions of the preferred embodiments of the present application. It should be noted that improvements and modifications can be made by those of ordinary skill in the art without departing from the principles of the present application, and these improvements and modifications should also be considered as falling within the protection scope of the present application.

What is claimed is:

1. A pulse shaper, comprising a grating, a cylindrical lens, and a two-dimensional spatial light modulator (2D-SLM), wherein
the grating scatters an incident laser pulse into a space, and the scattered laser pulse passes through the cylindrical lens to form multiple linear light beams that are uniformly distributed and have different wavelengths;
the linear light beams pass through the 2D-SLM for a phase modulation and spectral intensity control; the 2D-SLM comprises a pixel array composed of multiple liquid crystals; along a Y-axis, each column of pixels in the pixel array corresponds to the linear light beam of a same wavelength; along an X-axis, different columns of pixels in the pixel array respectively correspond to the linear light beams of different wavelengths; by controlling the whole column of pixels corresponding to each linear light beam of a different wavelength in the pixel array of the 2D-SLM along the Y-axis, a certain proportion of the linear light beam is refracted to an effective transmission direction to control a spectral intensity of the linear light beam; and
after the phase modulation and spectral intensity control, the linear light beams are converted back to a laser pulse by the cylindrical lens and the grating to be output.

2. The pulse shaper according to claim 1, wherein the linear light beams converge along the X-axis and remain unchanged along the Y-axis; and all the linear light beams of different wavelengths are uniformly distributed along the X-axis.

3. The pulse shaper according to claim 2, wherein the whole column of pixels corresponding to each linear light beam of the different wavelength in the pixel array of the 2D-SLM along the Y-axis correspondingly forms a grating-like serrated surface with an angle, intensity, and frequency changing with the wavelength;
the frequency and intensity of the serrated surface are controlled to refract the certain proportion of the linear light beam to the effective transmission direction to control the spectral intensity of the linear light beam; and a refractive index of the whole column of pixels is controlled to control a spectral phase of the linear light beam with a corresponding wavelength.

4. A laser pulse shaping device, comprising a pulse shaper, a control device, and a laser detection device that are connected in sequence, wherein the pulse shaper is configured in the pulse shaper according to claim 1;
the pulse shaper is provided in an optical path connected to a laser source, and the laser detection device is provided at an actual position of a target of the laser pulse;
the laser source is configured to generate the laser pulse that is transmitted to the target through the optical path;
the laser detection device is configured to measure and send an optical parameter of the laser pulse transmitted to the target to the control device; and
the control device is configured to calculate a phase compensation parameter according to the optical parameter and control the pulse shaper to compensate a phase of the laser pulse transmitted through the optical path according to the phase compensation parameter, such that the optical parameter of the laser pulse transmitted to the target reaches a target value.

5. The laser pulse shaping device according to claim 4, wherein the control device is configured to calculate, according to the optical parameter, a phase function of a spectral phase dispersion accumulated by the laser pulse in the whole optical path and a negative function corresponding to the phase function, and send the negative function to the pulse shaper; and
the pulse shaper is configured to introduce the negative function to the optical path to act on the laser pulse to offset the spectral phase dispersion of the laser pulse.

6. A laser pulse shaping method configured for the laser pulse shaping device according to claim 4, comprising the following steps:
receiving the laser pulse generated by the laser source, and transmitting the laser pulse to the target of the laser pulse through the optical path connected to the laser source;
measuring the optical parameter of the laser pulse transmitted to the target at the actual position of the target of the laser pulse; and
calculating the phase compensation parameter according to the optical parameter, and compensating the phase of the laser pulse transmitted through the optical path according to the phase compensation parameter, such that the optical parameter of the laser pulse transmitted to the target reaches the target value.

7. The laser pulse shaping method according to claim 6, wherein the step of calculating the phase compensation parameter according to the optical parameter comprises:
calculating, according to the optical parameter, a phase function of a spectral phase dispersion accumulated by the laser pulse in the whole optical path before the laser pulse reaches the target, and acquiring a negative function of the phase function, wherein the optical parameter is a nonlinear optical signal intensity.

8. The laser pulse shaping method according to claim 7, wherein the step of compensating the phase of the laser pulse transmitted through the optical path according to the phase compensation parameter comprises:

introducing the negative function to the optical path to act on the laser pulse to offset the spectral phase dispersion of the laser pulse.

9. The laser pulse shaping method according to claim 6, wherein the target value is a width of the laser pulse that reaches a Fourier transform limit on the target.

10. An optical system, comprising the laser source, the optical path, and the laser pulse shaping device according to claim 4.

11. The laser pulse shaping device according to claim 4, wherein in the pulse shaper, the linear light beams converge along the X-axis and remain unchanged along the Y-axis; and all the linear light beams of different wavelengths are uniformly distributed along the X-axis.

12. The laser pulse shaping device according to claim 11, wherein in the pulse shaper, the whole column of pixels corresponding to each linear light beam of the different wavelength in the pixel array of the 2D-SLM along the Y-axis correspondingly forms a grating-like serrated surface with an angle, intensity, and frequency changing with the wavelength;

the frequency and intensity of the serrated surface are controlled to refract the certain proportion of the linear light beam to the effective transmission direction to control the spectral intensity of the linear light beam; and a refractive index of the whole column of pixels is controlled to control a spectral phase of the linear light beam with a corresponding wavelength.

13. The laser pulse shaping method according to claim 6, wherein in the laser pulse shaping device, the control device is configured to calculate, according to the optical parameter, a phase function of a spectral phase dispersion accumulated by the laser pulse in the whole optical path and a negative function corresponding to the phase function, and send the negative function to the pulse shaper; and the pulse shaper is configured to introduce the negative function to the optical path to act on the laser pulse to offset the spectral phase dispersion of the laser pulse.

14. The optical system according to claim 10, wherein in the laser pulse shaping device, the control device is configured to calculate, according to the optical parameter, a phase function of a spectral phase dispersion accumulated by the laser pulse in the whole optical path and a negative function corresponding to the phase function, and send the negative function to the pulse shaper; and the pulse shaper is configured to introduce the negative function to the optical path to act on the laser pulse to offset the spectral phase dispersion of the laser pulse.

* * * * *